(12) United States Patent
Mochizuki et al.

(10) Patent No.: US 7,988,360 B2
(45) Date of Patent: Aug. 2, 2011

(54) MOTION GUIDE DEVICE

(75) Inventors: Hiroaki Mochizuki, Tokyo (JP);
Tomozumi Murata, Tokyo (JP);
Takashi Sakuyama, Tokyo (JP)

(73) Assignee: THK Co., Ltd., Tokyo (JP)

( * ) Notice: Subject to any disclaimer, the term of this patent is extended or adjusted under 35 U.S.C. 154(b) by 376 days.

(21) Appl. No.: 12/092,326

(22) PCT Filed: Oct. 31, 2006

(86) PCT No.: PCT/JP2006/321796
§ 371 (c)(1),
(2), (4) Date: Jan. 7, 2009

(87) PCT Pub. No.: WO2007/052678
PCT Pub. Date: May 10, 2007

(65) Prior Publication Data
US 2009/0154849 A1    Jun. 18, 2009

(30) Foreign Application Priority Data
Nov. 1, 2005    (JP) .................................. 2005-318110

(51) Int. Cl.
*F16C 29/06* (2006.01)
(52) U.S. Cl. ............................................. 384/45; 384/43
(58) Field of Classification Search .............. 384/43–45
See application file for complete search history.

(56) References Cited

U.S. PATENT DOCUMENTS

| 4,749,284 A | 6/1988 | Teramachi | |
|---|---|---|---|
| 2005/0213856 A1* | 9/2005 | Geka et al. | 384/45 |
| 2007/0025651 A1* | 2/2007 | Kakei | 384/45 |
| 2008/0025654 A1* | 1/2008 | Kuo | 384/45 |

FOREIGN PATENT DOCUMENTS

| EP | 1 793 135 A1 | 6/2007 |
|---|---|---|
| JP | 61-274118 A | 12/1986 |
| JP | 2-89810 A | 3/1990 |
| JP | 2001-336526 A | 12/2001 |
| JP | 2004-68880 A | 3/2004 |
| WO | 2006-022321 A1 | 3/2006 |

OTHER PUBLICATIONS

Patent Cooperation Treaty International Preliminary Report on Patentability (Form PCT/IB/338) of International Application No. PCT/JP2005/321796 with an International filing date of Oct. 31, 2006 with English translation of Forms PCT/IPEA/409.
International Preliminary Report on Patentability (Form PCT/IPEA/409) of International Application No. PCT/JP2006/321796 having a International filing date of Oct. 31, 2006.
International Search Report of PCT/JP2006/321796, date of mailing Feb. 6, 2007.

\* cited by examiner

*Primary Examiner* — Thomas R Hannon
(74) *Attorney, Agent, or Firm* — Westerman, Hattori, Daniels & Adrian, LLP

(57) ABSTRACT

Provided is a motion guide device having a scooping portion that is not damaged even when a moving member is moved at high speed.
When seen in an axial direction of a track shaft 1, a direction change path 10 is inclined relative to a contact angle line L1 (line connecting a center C of a ball 3 and a bottom P1 of a ball rolling groove 1*a*). The direction change path 10 including a scooping portion 17 has a cross section of Gothic arch groove shape formed of two arcs R1 in such a manner that the ball 3 is in contact with the direction change path 10 at two points. The direction change path 10 is twisted in such a manner that a locus 18 of the top of the Gothic arch groove shape approaches the contact angle line L1 at the scooping portion 17.

3 Claims, 24 Drawing Sheets

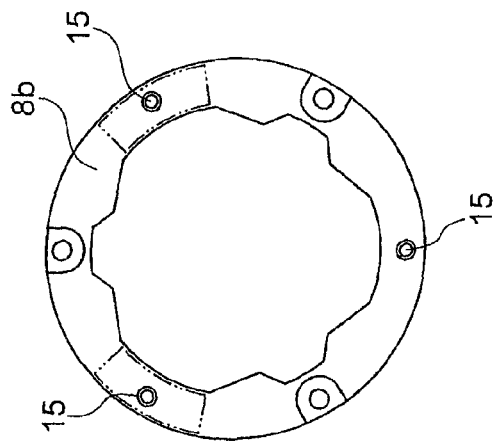
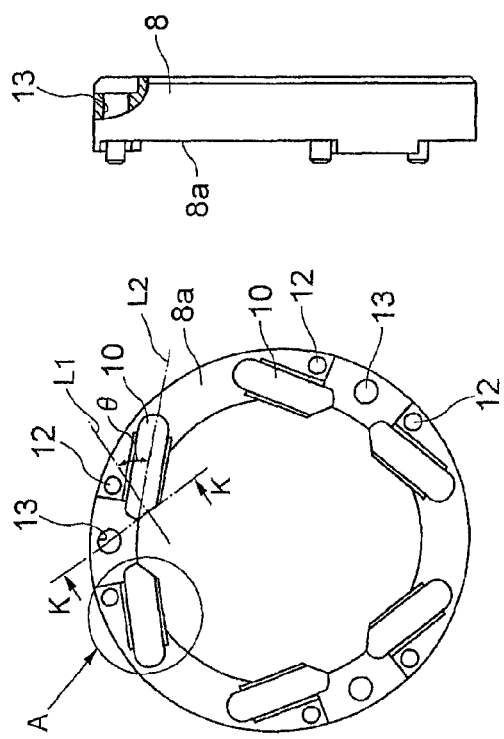
FIG.3(A)　　FIG.3(B)　　FIG.3(C)

Detailed view of F part

Detailed view of B part

View taken along the arrows K-K

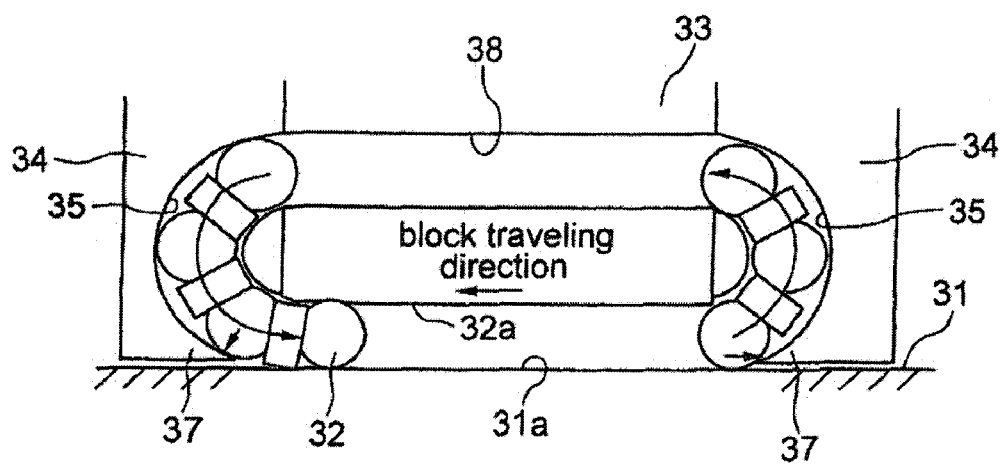
Prior Art    FIG.15

Prior Art  FIG.16
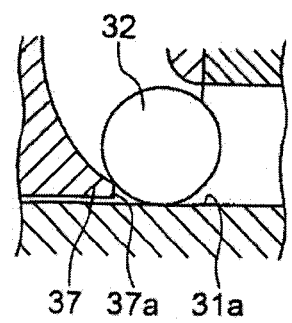

Prior Art FIG.17
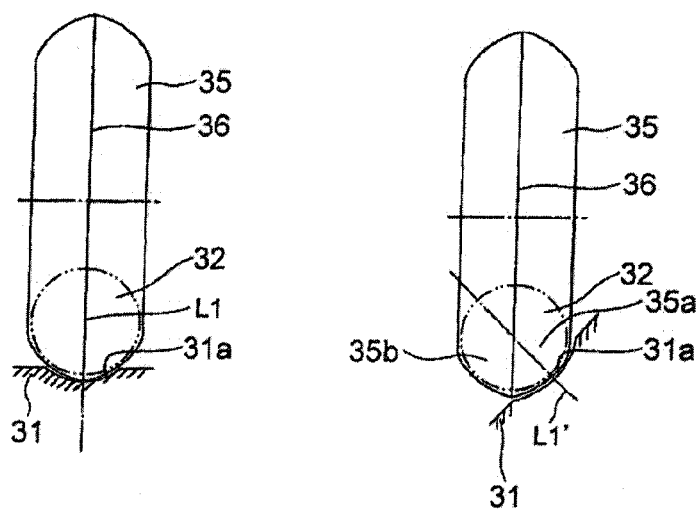

Prior Art   FIG.18
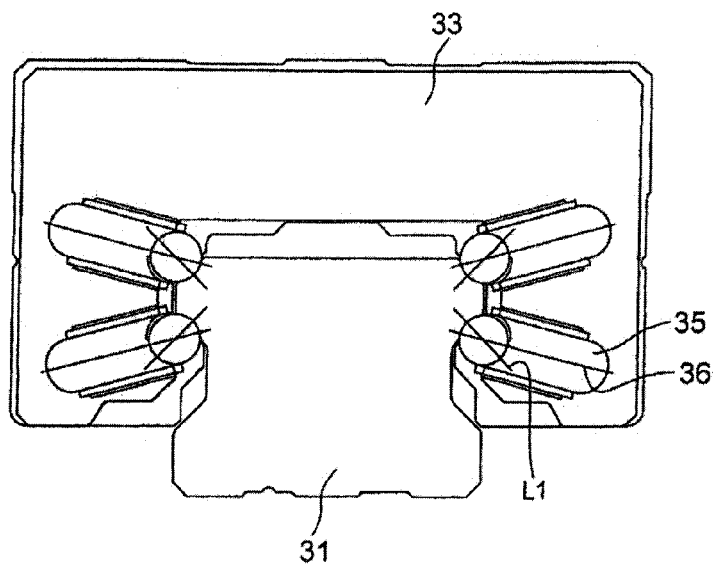

FIG.21
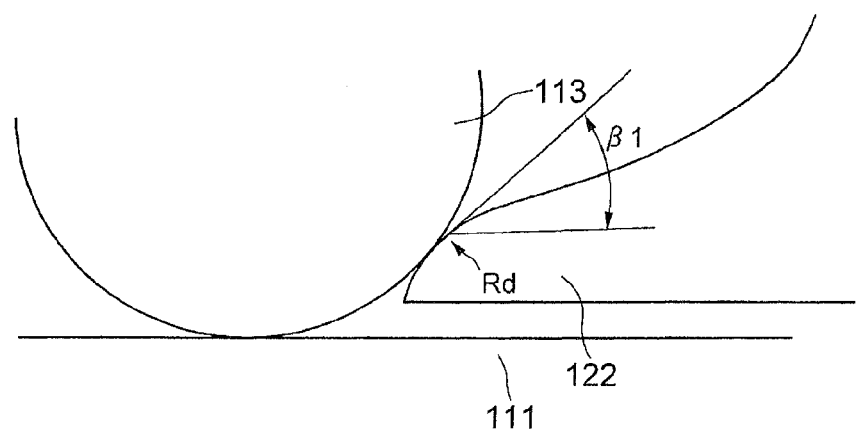
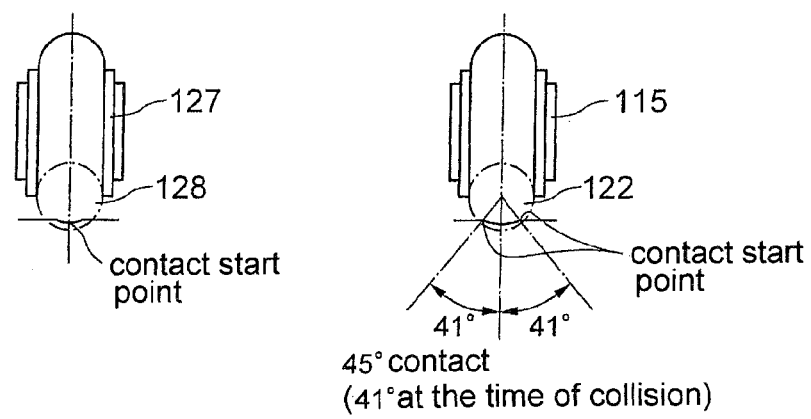
FIG.22(A)  FIG.22(B)

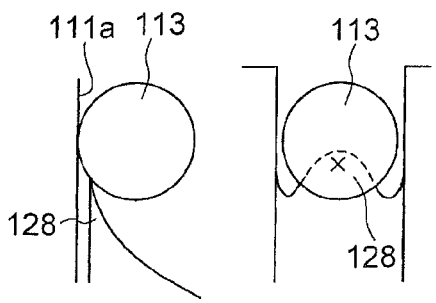
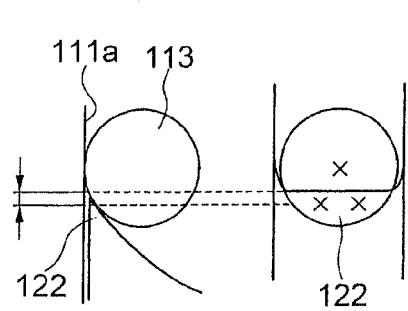
FIG.23(A)    FIG.23(B)
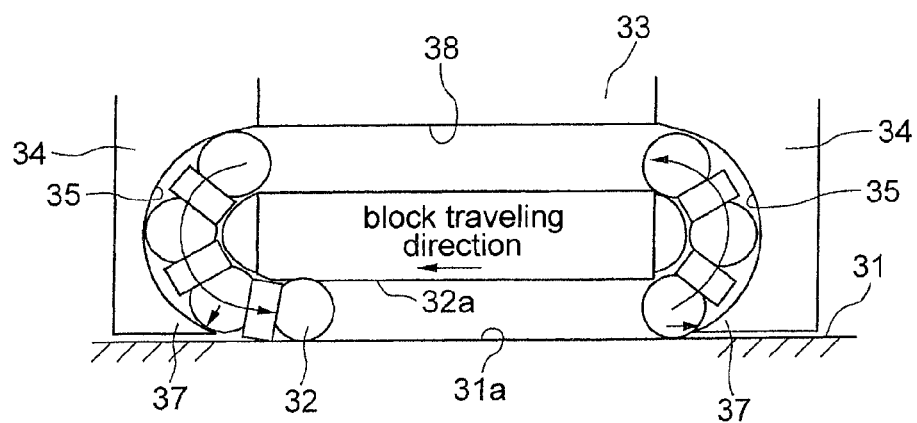
FIG.24

US 7,988,360 B2

MOTION GUIDE DEVICE

TECHNICAL FIELD

The present invention relates to a motion guide device having a moving member moving relative to a track member, such as a linear guide, a ball spline and the like.

BACKGROUND ART

A motion guide device is mounted in a robot, a machine tool or a semiconductor/liquid crystal manufacturing apparatus and is used to guide linear movement or curvilinear movement of a moving body.

Known as a motion guide device are a linear guide, a ball spline and the like. The linear guide has, as illustrated in FIG. 15, a track rail 31 having ball rolling grooves 31a formed therein, and a moving block 33 mounted on the track rail 31 via a plurality of balls 32 to be slidable along the track rail 31. In the moving block 33, a plurality of loaded ball rolling grooves 32a facing the ball rolling grooves of the track rail 31 and ball return paths 38 in parallel with the loaded ball rolling grooves 32a are formed. To each traveling-directional end of the moving block 33, an end plate 34 is attached. In the end plate 34, a U-shaped direction change path 35 is formed connecting the loaded ball rolling grooves 32a and the ball return paths 38 extending in parallel with each other. These loaded ball rolling groove 32a, ball return path 38 and direction change path 35 constitute a circular ball circulation path.

After rolling in the ball rolling groove 31a of the track rail 31, each ball is scooped up by a scooping portion 37 at the lower end of the end plate 34 and enters the direction change path 35. Then, the ball passes through the ball return path 38 and the opposite-side direction change path 35, and then the ball is pushed by the following ball 32 to enter the ball rolling groove 31a at the scooping portion 37.

In such a motion guide device, when the moving block 33 is moved at high speed, the scooping portion 37 at the lower end of the end plate 34 is sometimes damaged, which is a problem. This damage is caused because when the ball 32 rolls from the direction change path 35 into the ball rolling groove 31a, the ball 32 pushes the scooping portion 37 outward by a centrifugal force or the ball 32 is pushed near the scooping portion 37 toward the outside of the scooping portion 37 by a meandering follow-on ball 32. Besides, when the ball 32 is scooped up from the ball rolling groove 31a, a scooping force is applied to the scooping portion 37.

In order to solve this problem, there has been developed a motion guide device of which a scooping portion is hardly damaged even when the motion guide device is operated at high speed. For example, as shown in FIG. 16, the motion guide device as developed has a scooping portion 37 of which a tip end is cut off and a cut surface 37a is a flat surface perpendicular to the ball rolling groove 31a (see patent document 1). According to the invention disclosed in the patent document 1, as the sharp-pointed tie end of the scooping portion 37 is cur off, it is possible to enhance the strength of the scooping portion 37. However, as the cut surface 37a is the flat surface perpendicular to the ball rolling groove 31a, it is difficult to circulate a ball 32 smoothly.

[Patent Document 1] Japanese Patent Laid-open Publication No. 2004-68880
[Non-Patent Document 1] Japanese Patent Application No. 2004-246524

DISCLOSURE OF INVENTION

Problems to be Solved by the Invention

In the meantime, in a motion guide device such as a linear guide, a ball spline or the like, as shown in the left-side view of FIG. 17, the center line 36 of the direction change path 35 seen in the axial direction of the track rail 31 usually agrees with the contact angle line L1 of the ball 32 (line connecting the center of the ball 32 and the bottom of the ball rolling groove, the definition of the contact angle line will be described later). In this case, the locus of the top of the Gothic arch groove shape is positioned on the contact angle line L1. Then, the ball 32 moves in the direction of the contact angle line L1 in the direction change path 35.

However, in view of the space problem, the contact angle line L1 is sometimes required to be inclined relative to the direction change path 35. The right-side view of FIG. 17 shows the contact angle line which is inclined from L1 to L1' relative to the direction change path 35. When seen from the contact angle line L1', the direction change path 35 is said to be inclined. For example, in a linear guide shown in FIG. 18, the direction change path 35 is inclined relative to the contact angle line L1 in consideration of the space problem.

When the direction change path 35 is inclined and still has a Gothic arch groove shape, as shown in FIG. 17, a ball 32 is scooped up by one side 35a of the Gothic arch groove shape. When the ball 32 is returned from the direction change path 35 to the ball rolling groove 31a, the ball is in contact only with the one side 35a of the Gothic arch groove shape. In other words, the ball 32 is always in contact with the one side 35a of two-side Gothic arch groove shape and is never in contact with the other side 35b. With this structure, the Gothic arch groove shape produces little effect. Accordingly, when the ball is rolled at high speed, the scooping portion may be damaged.

Then, the present invention has an object to provide a motion guide device having a scooping portion which is not damaged even when the moving member is moved at high speed.

Means for Solving the Problem

The present invention will now be described below.

In order to solve the above-mentioned problems, the invention of claim 1 is a motion guide device 1 comprising: a track member having a ball rolling groove formed therein; a moving member having formed therein a loaded ball rolling groove facing the ball rolling groove, a ball return path extending in parallel with the loaded ball rolling groove and a direction change path connecting the loaded ball rolling groove and the ball return path; and a plurality of balls arranged in a ball circulation path including the loaded ball rolling groove, the ball return path and the direction change path, after rolling in the ball rolling groove of the track member each of the balls being scooped up into the direction change path by a scooping portion of the direction change path, and the ball in the direction change path being returned to the ball rolling groove by the scooping portion, wherein the direction change path is inclined relative to a contact angle line (line connecting a center of the ball and a bottom of the ball rolling groove) when seen in an axial direction of the track member, the direction change path including the scooping portion has a cross section of Gothic arch groove shape formed of two arcs in such a manner that the ball is in contact with the direction change path at two points, and the direction change path is twisted in such a manner that a locus of top of the Gothic arch groove shape approaches the contact angle line at the scooping portion.

The invention of claim 2 is characterized in that in the motion guide device according to claim 1, the direction change path has a twisting area and a non-twisting area, and a tangential direction of the locus of the top of the Gothic arch groove shape becomes continuous at a boundary between the twisting area and the non-twisting area.

The invention of claim 3 is a motion guide device comprising: a track member having a ball rolling groove formed therein; a moving member having formed therein a loaded ball rolling groove facing the ball rolling groove, a ball return path extending in parallel with the loaded ball rolling groove and a direction change path connecting the loaded ball rolling groove and the ball return path; and a plurality of balls arranged in a ball circulation path including the loaded ball rolling groove, the ball return path and the direction change path, after rolling in the ball rolling groove of the track member each of the balls being scooped up into the direction change path by a scooping portion of the direction change path, and the ball in the direction change path being returned to the ball rolling groove by the scooping portion, wherein the direction change path is inclined relative to a contact angle line (line connecting a center of the ball and a bottom of the ball rolling groove) when seen in an axial direction of the track member, the scooping portion has a cross section of Gothic arch groove shape formed of two arcs so as to be in contact with the ball at two points, and a top of the Gothic arch groove shape at the scooping portion is positioned in proximity to the contact angle line.

Effects of the Invention

According to the invention of claim 1, even if the direction change path is inclined relative to the contact angle line, each ball is prevented from being in contact with only one side of the two-side Gothic arch groove shape. In other words, the scooping portion scoops up the ball with use of both sides of the Gothic arch groove shape and returns the ball from the direction change path into the ball rolling groove with use of the both sides of the Gothic arch groove shape. Hence, even when the moving member is moved at high speed, the scooping portion is prevented from being damaged.

According to the invention of claim 2, the tangential direction of the locus of the top of the Gothic arch groove shape is continuous at the boundary between the twisting area and the non-twisting area of the direction change path. With this structure, a ball in two-point contact with the Gothic arch groove does not change its rolling direction abruptly but gradually. Therefore, smooth circulation of the ball is allowed.

According to the invention of claim 3, even if the direction change path is inclined relative to the contact angle line, each ball is prevented from being in contact with only one side of the two-side Gothic arch groove shape. In other words, the scooping portion scoops up the ball with use of both sides of the Gothic arch groove shape and returns the ball from the direction change path into the ball rolling groove with use of the both sides of the Gothic arch groove shape. Hence, even when the moving member is moved at high speed, the scooping portion is prevented from being damaged.

BRIEF DESCRIPTION OF DRAWINGS

FIGS. 3(A) to 3(C) are views each illustrating an end plate (FIG. 3(A) being a back side view, FIG. 3(B) being a side view and FIG. 3(C) being a front view);

FIG. 15 is a cross sectional view illustrating a conventional motion guide device;

FIG. 16 is a cross sectional view illustrating a conventional scooping portion;

FIG. 17 is a view showing inclination of the direction change path seen in the axial direction of the track rail (conventional example); and FIG. 18 is a cross sectional view showing a linear guide having an inclined direction change path (conventional example).

BRIEF DESCRIPTION OF REFERENCES

Figure 1:
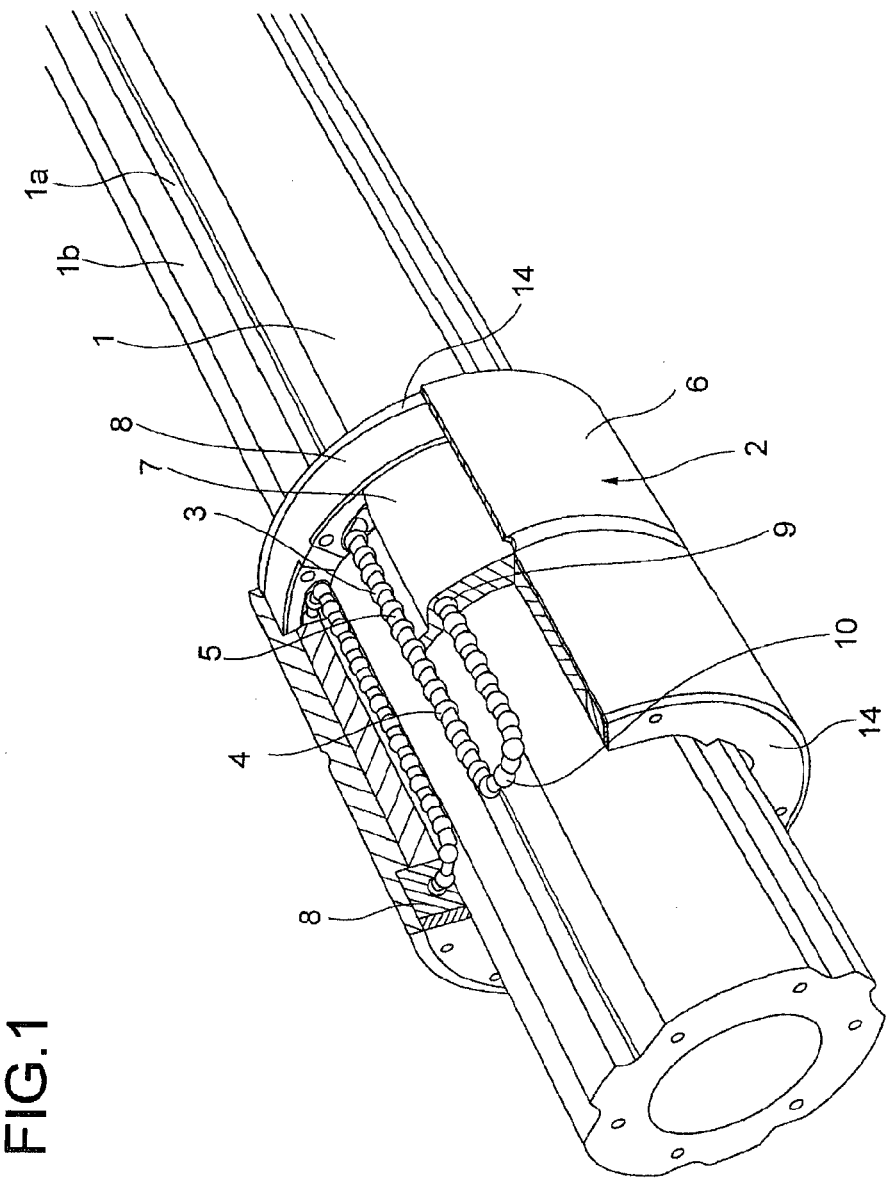
FIG. 1 is a perspective view illustrating a ball spline according to a first embodiment of the present invention.

1 . . . track shaft (track member)
1a . . . ball rolling groove
2 . . . spline nut (moving member)
2a . . . loaded ball rolling groove
3 . . . ball
4 . . . ball circulation path
9 . . . ball return path
10 . . . direction change path
17 . . . scooping portion
18 . . . locus
21 . . . top
24 . . . boundary
S1 . . . twisting area
S2 . . . non-twisting area
t1 . . . tangential direction of the locus

BEST MODES FOR CARRYING OUT THE INVENTION

Figure 2:
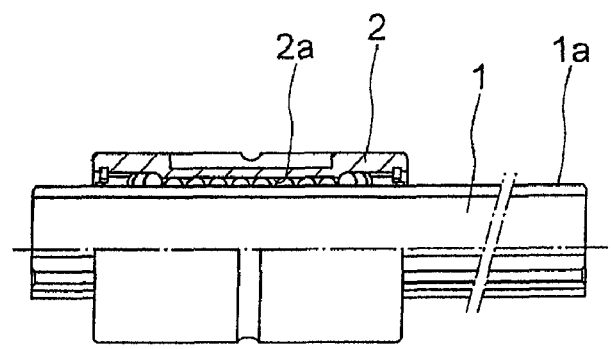
FIG. 2 is a cross sectional view of the ball spline taken along the axial line.

With reference to the attached drawings, the present invention will now be described in detail below. FIG. 1 illustrates a motion guide device (ball spline) according to a first embodiment of the present invention. A track shaft 1 as a track member has an outer surface on which ball rolling grooves 1a are formed extending in the axial direction. A spline nut 2 as a moving member is inserted onto the track shaft 1. The spline nut 2 has an inner surface on which loaded ball rolling grooves 2a are formed facing the respective ball rolling grooves 1a (see the cross sectional view of FIG. 2). In order to enable ball circulation, circular ball circulation paths 4 are formed in the spline nut 2. In these ball circulation paths 4, a plurality of balls 3 is arranged. Between each two of balls 3, a spacer 5 is arranged for preventing contact between the balls 3.

On the surface of the track shaft 1, a plurality of raised threads 1b is formed extending in the axial direction. At each side of each raised thread 1b, one ball rolling groove 1a is formed extending in the axial direction of the track shaft 1. Each raised thread 1b is sandwiched between two ball rolling grooves 1a in order to bear torques on the spline nut 2.

Each ball rolling groove 1a is a circular arc groove having a cross section formed of a single arc (see FIG. 4). The curvature radius of the ball rolling groove 1a is slightly larger than the radius of each ball 3. The ball rolling groove 1a and each ball 3 are in contact with each other at one point having a certain contact area. The line connecting the center C of the ball 3 and the bottom P1 of the ball rolling groove 1a is called contact angle line L1. The contact angle line L1 is described in detail later. Here, the ball rolling groove 1a may be formed as a Gothic arch groove having a cross section formed of two arcs.

As shown in FIG. 1, the spline nut 2 inserted onto the track shaft 1 has a nut main body 6 having the loaded ball rolling grooves 2a, a retainer 7 mounted in the nut main body 6 to prevent balls 3 from dropping from the spline nut 2 and a pair of end plates 8 attached to respective ends in the travelling direction of the nut main body 6.

The cross-sectional shape of each loaded ball rolling groove 2a of the nut main body 6 is formed as a circular arc groove having a cross section formed of a single arc or a Gothic arch groove having a cross section formed by two arcs.

In the retainer 7, a ball return path 9 is formed in parallel with the loaded ball rolling groove 2a of the spline nut 2. Besides, in this retainer 7, the inner side of a U-shaped direction change path 10 is formed connecting the loaded ball rolling groove 2a and the ball return path 9. This retainer 7 holds balls 3 arranged in the loaded ball rolling groove 2a so as to prevent the balls 3 from dropping from the spline nut 2 when the spline nut 2 is removed from the track shaft 1.

In each end plate 8 the outer side of the direction change path 10 is formed. The retainer 7 and the end plate 8 are combined into the U-shaped direction change path 10.

The loaded ball rolling groove 2a, the ball return path 9 and the paired direction change paths 10 consist in a circular ball circulation path. When the spline nut 2 is moved relative to the track shaft 1, balls 3 roll, under load, in the axial direction, in the loaded rolling path between the ball rolling groove 1a and the loaded ball rolling groove 2a. Once reaching one end of the loaded rolling path, each ball 3 is scooped up by a scooping portion formed in the direction change path 10 of an end plate 8 and is brought into the direction change path 10. Then, the travelling direction of the ball 3 is reversed by the direction change path 10, and the ball 3 enters the ball return path 9. After the ball 3 has passed through the ball return path 9, the direction of the ball 3 is reversed again by an opposite-side direction change path 10 and the ball 3 is returned from the scooping portion of the end plate 8 into the loaded rolling path.

FIGS. 3(A) to 3(C) illustrate an endplate 8. In the back surface 8a of the end plate 8, the outer side of the direction change path 10 is formed. The inner side of the direction change path 10 is formed in the retainer 7 as described above. The endplate 8 and the retainer 7 are combined to form the direction change path having an approximately circular cross section. In the back surface 8a of the end plate 8, projections 12 are provided to position the end plate 8 relative to the retainer 7. Besides, in the end plate 8, there are through holes 13 formed for mounting the end plate 8 onto the retainer 7. As shown in FIG. 1, the end plate 8 is covered with a ring-shaped cover 14. In the front surface 8b of the end plate 8, screw holes 15 are formed for mounting the cover 14 to the end plate 8.

As shown in FIG. 3(A), the center line L2 of the direction change path 10 seen in the axial direction of the track shaft 1 does not agree with the contact angle line L1 and crosses the contact angle line L1 at the angle of 0 degree (for example, 45 degrees). In some ball splines and linear guides, the direction change path 10 is thus inclined so as to solve the problem of space. This embodiment approaches such a problem as arises when the direction change path 10 is thus inclined.

Before the shape of the direction change path 10 of the end plate 8 is described in detail, the contact angle line L1 is defined and the basic design idea of the direction change path 10 is explained.

Figure 4A:
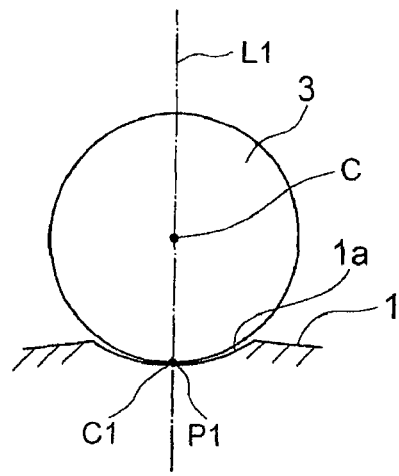
FIGS. 4(A) to 4(B) are views showing the definitions of the contact angle line (FIG. 4(A) showing the contact angle line of the circular arc groove shape, and FIG. 4(B) showing the contact angle line of the Gothic arch groove shape)
Figure 4B:
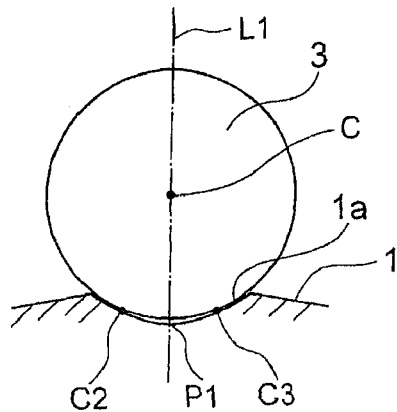

FIGS. 4(A) and 4(B) illustrate the contact angle line L1. The contact angle line L1 is a line connecting the center C of the ball 3 and the bottom P1 of the ball rolling groove 1a. The cross-sectional shape of the ball rolling groove 1a may be a circular arc groove shape of a single arc as shown in FIG. 4(A) or a Gothic arch groove shape formed of two arcs as shown in FIG. 4(B). In the case of the circular arc groove shape, the bottom P1 of the ball rolling groove agrees with the contact point C1 between the ball 3 and the ball rolling groove 1a. Hence, the contact angle line L1 in the case of the circular arc groove shape is defined as a line connecting the center C of the ball 3 and the contact point C1 between the ball 3 and the ball rolling groove 1a. On the other hand, in the case of the Gothic arch groove shape, the bottom P1 of the ball rolling groove 1a is shifted from the contact points C2 and C3 between the ball 3 and the two arcs, and matches the intersection of the two arcs. The contact angle line L1 in the case of the Gothic arch groove shape is defined as a line connecting the center of the ball 3 to the intersection P1 which is the bottom of the ball rolling groove 1a.

Figure 5:
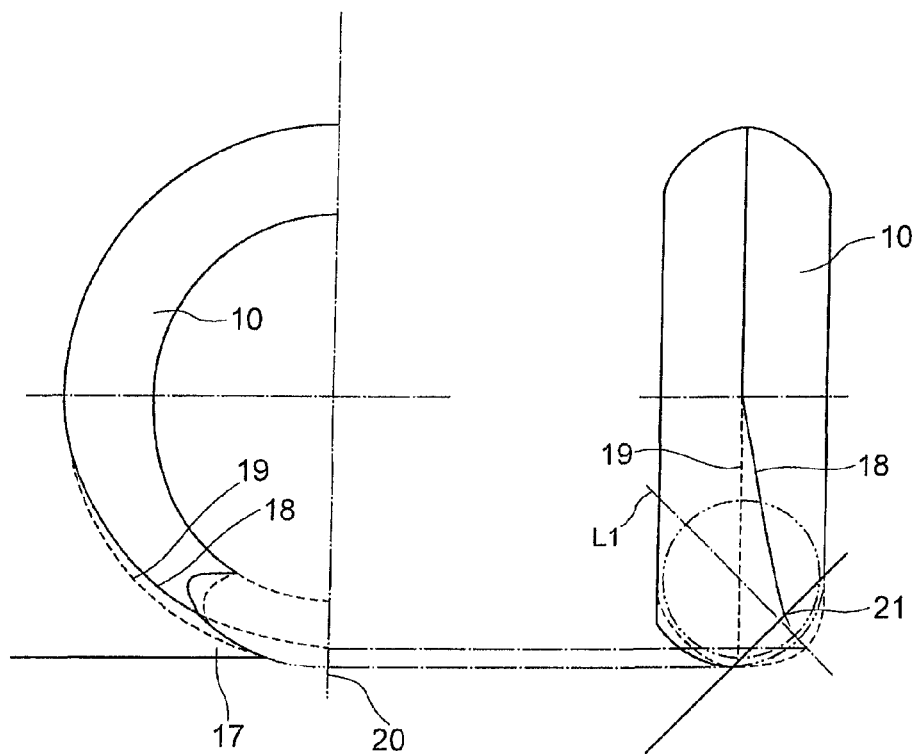
FIG. 5 is a detailed view of the direction change path.

FIG. 5 is a detailed view of the direction change path. The right side view of FIG. 5 is a front view of the direction change path 10 seen in the axial direction of the track shaft 1, while the left side view of FIG. 5 is a side view of the direction change path 10. The direction change path 10 has at its lower end a scooping portion 17, which scoops up each ball 3 rolling in the ball rolling groove 1a into the direction change path 10 and returns the ball 3 from the direction change path 10 into the ball rolling groove 1a.

Over the whole length of the direction change path 10, the cross section of the direction change path 10 in a plane perpendicular to the rolling direction of the ball 3 is shaped as a Gothic arch formed of two arcs. Therefore, the direction change path 10 and each ball 3 are in contact with each other at two points. The locus 18 of the top (intersection of the two arcs) of the Gothic arch groove is positioned at the outermost side of the direction change path 10. This is for bearing the force of the balls 3 pushing the direction change path 10 toward the outside by the centrifugal force.

Then, the direction change path 10 is twisted halfway as it becomes closer to the ball rolling groove 1a (lower end of the direction change path). Since the direction change path 10 is twisted, the locus 18 of the top of the Gothic arch groove goes away from the outermost locus 19 (shown by the broken line in the figure) as it is closer to the ball rolling groove 1a (lower end of the direction change path), and the locus 18 becomes closer to the contact angle line L1. The locus 18 of the top of the Gothic arch groove is ideally positioned on the contact angle line L1 ultimately. However, as the scooping portion 17 of the direction change path 10 is slightly shifted back from the end 20 of the ball rolling groove 1a, the top 21 at the tip end of the scooping portion 17 does not reach the contact angle line L1 and is slightly shifted thereform as shown in the right side view of FIG. 5. This is also clear from FIG. 6 explained below.

Figure 6:
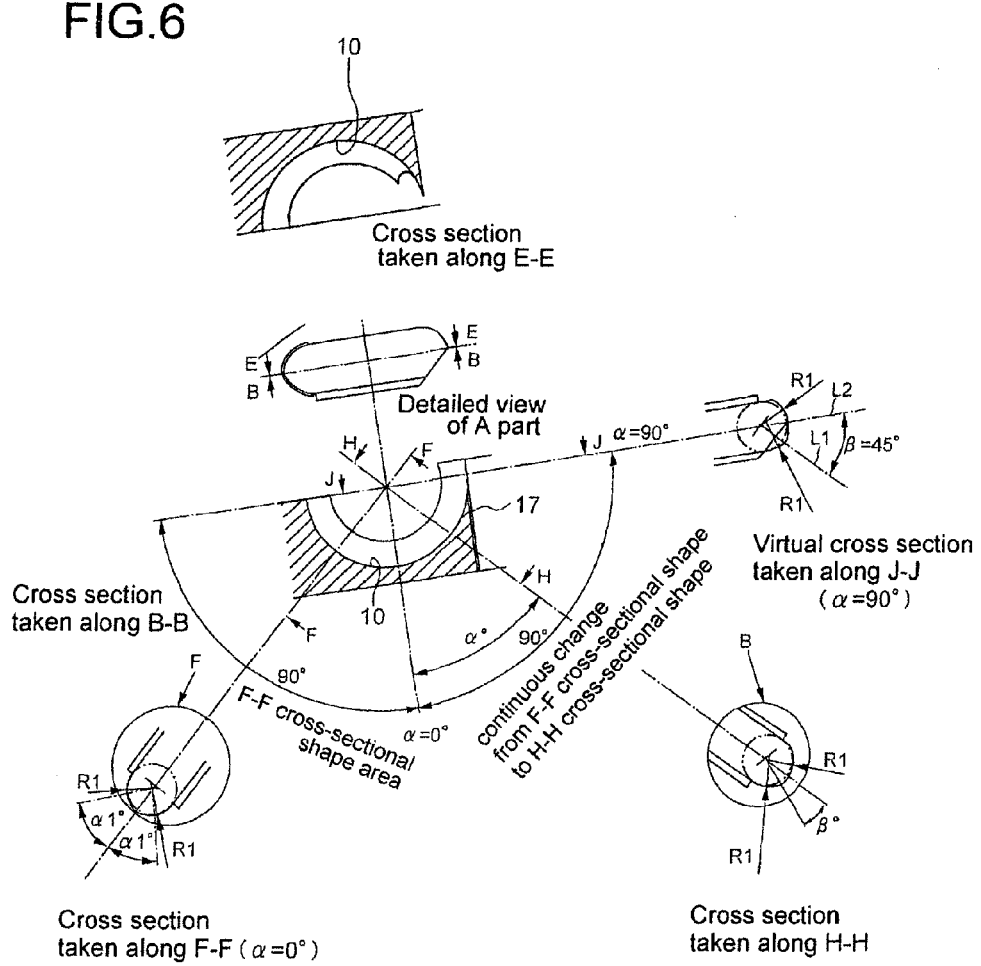
FIG. 6 is a detailed view of the direction change path.

FIG. 6 is a detailed view showing the direction change path 10 of an actually designed end plate 8. As shown in the B-B cross section, the direction change path 10 is divided into a left-side area where the locus of the top of the Gothic arch groove is not twisted (non-twisting area) and a right-side area (twisting area) (area of $\alpha$=0 to 90 degrees).

Figure 7:
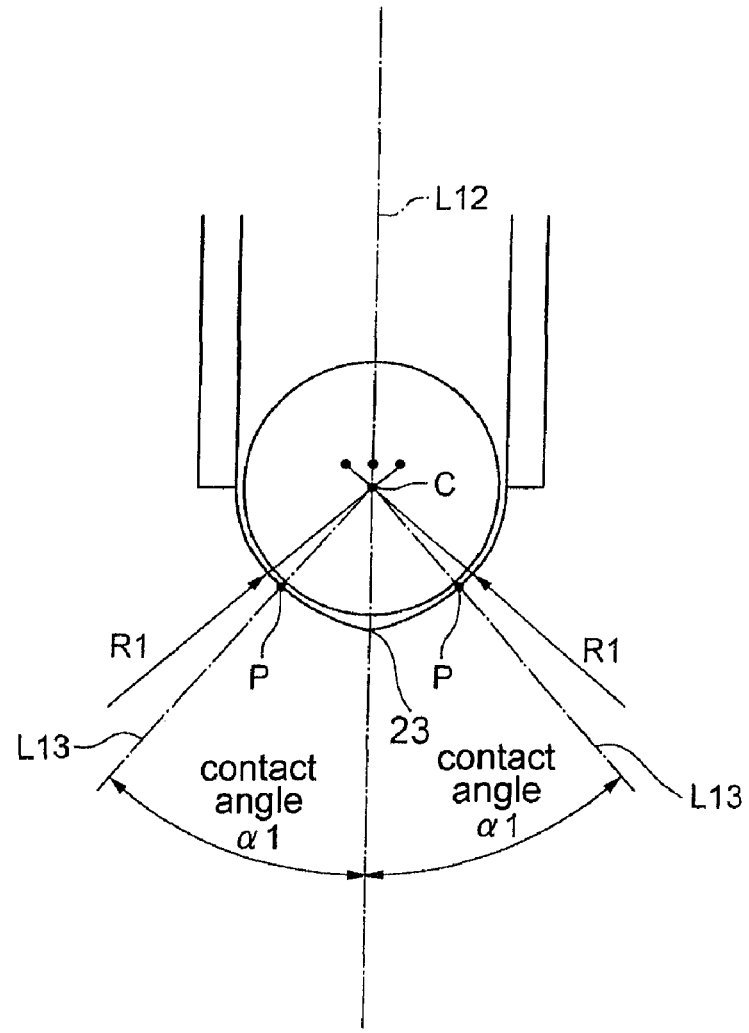
FIG. 7 is a detailed view of the F part in FIG. 6.

As shown in the F-F cross section on FIG. 6 and its detailed view on FIG. 7, the cross section of Gothic arch groove has two arcs R1 and R1. The line L 13 connecting the center C of the ball 3 to the point P where the Gothic arch groove and the ball 3 are in contact with each other and the line L12 connecting the center C of the ball 3 to the bottom 23 of the Gothic arch groove crosses each other at the contact angle $\alpha 1$ of more than 30 degrees (the angle $\alpha 1$ is preferably set to range from 40 degrees to 60 degrees, inclusive). Also at the scooping portion 17 at the tip end of the direction change path 10, the contact angle $\alpha 1$ is set in the same way. When the contact angle $\alpha 1$ is increased, the thickness of the scooping portion 17 is allowed to be increased.

Figure 8:
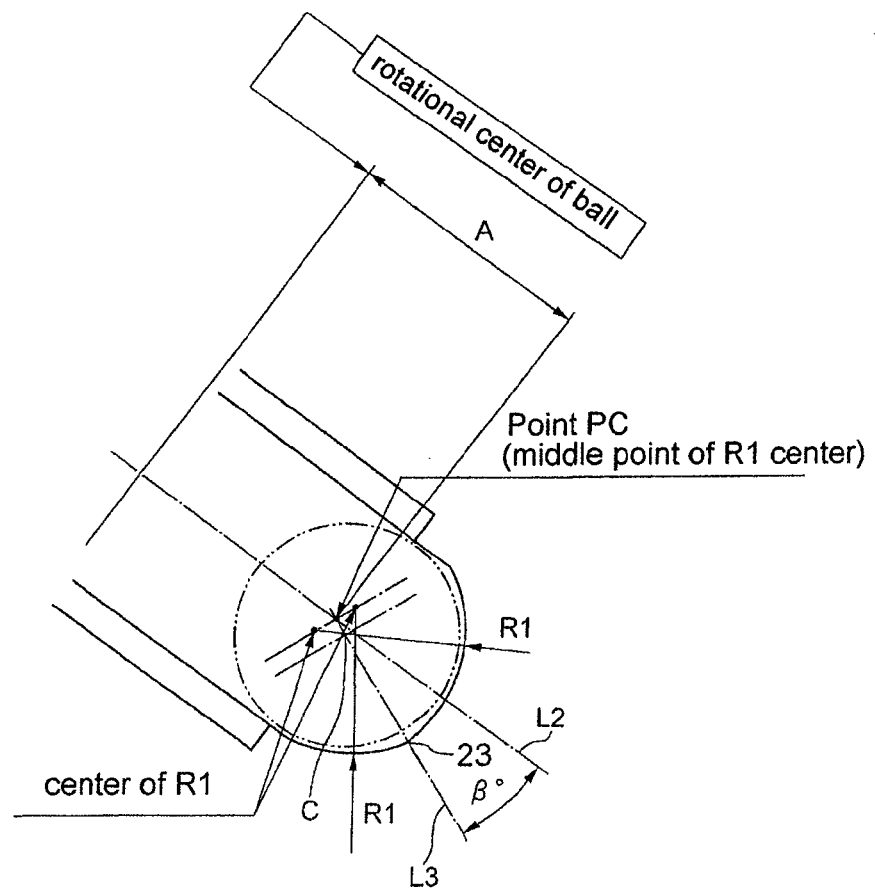
FIG. 8 is a detailed view of the B part in FIG. 6.

As shown in the H-H cross section on FIG. 6, when the angle $\alpha$ is changed from 0 degree to 90 degrees, the locus of the top of the Gothic arch groove is gradually twisted. In this area, as shown in the detailed view on FIG. 8, the middle point PC between the center points of the two arcs R1 of the Gothic arch groove shape is positioned a given distance A away from the ball rotational center for direction change, and the middle point PC is used as a center to draw an arc of $\beta$ degree, and thereby the Gothic arch groove shape is formed. In this area, the line L3 connecting the center C of the ball 3 and the bottom 23 of the Gothic arch groove shape forms an angle of $\beta$ degree relative to the center line L2 of the cross section of the direction change path 10. As shown in FIG. 6, the Gothic arch groove shape is changed continuously from the F-F cross-sectional shape to the H-H cross-sectional shape, with the transition of $\alpha$=0 degree to 90 degrees. Finally, in the J-J virtual cross section, the angle $\beta$ becomes 45 degrees and agrees with the inclination of the center line L2 of the direction change path relative to the contact angle line L1. Here, this agreement is only shown in the J-J virtual cross section, and actually, as the tip end of the scooping portion 17 is displaced back from the end 20 of the ball rolling groove 1a, the center line L2 of the direction change path 10 is displaced from the contact angle line L1 correspondingly.

Figure 9:
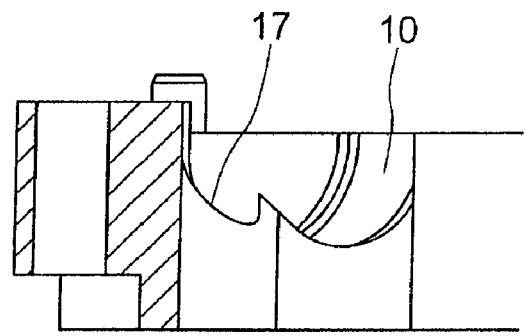
FIG. 9 is a view taken along the arrows K-K in FIG. 3(A)

FIG. 9 is a view taken along the arrows K-K of FIG. 3(A). The shape of the scooping portion 17 finally becomes as shown in this figure.

Figure 10A:
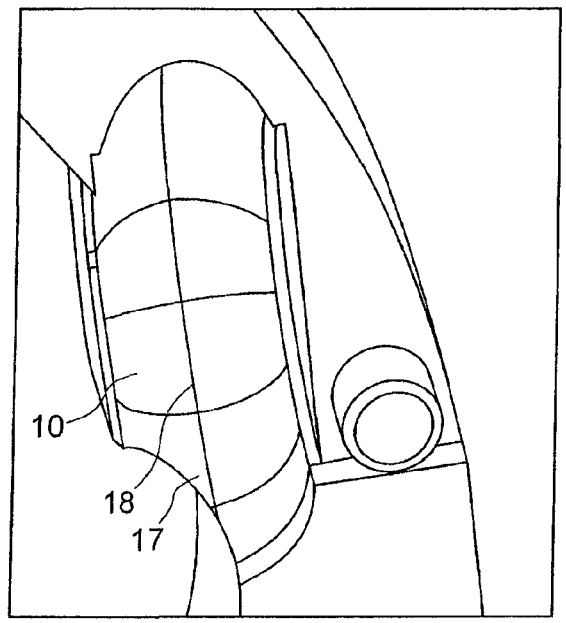
FIGS. 10(A) to 10(B) are perspective views of the direction change path (FIG. 10(A) showing a conventional non-twisting locus of the top of the Gothic arch groove shape and FIG. 10(B) showing a twisting locus of the top of the Gothic arch groove shape)
Figure 10B:
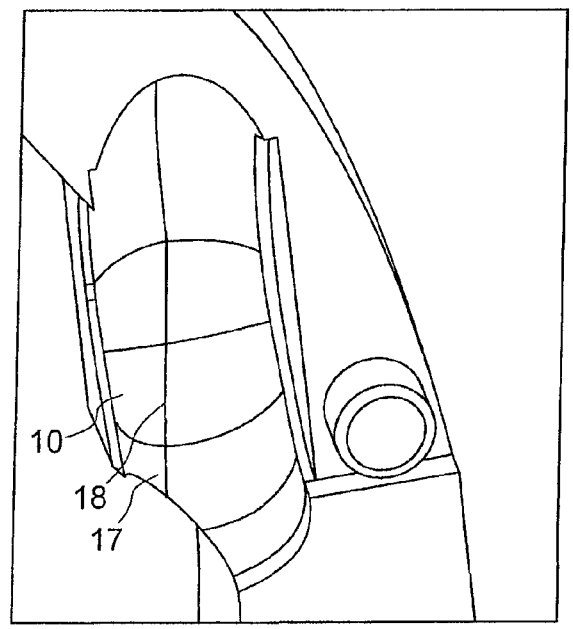
Figure 11:
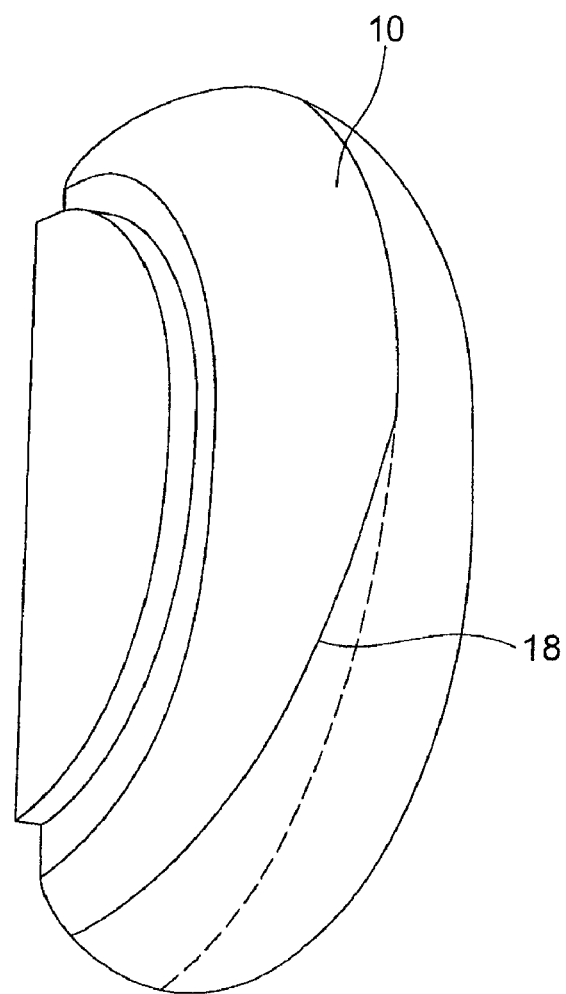
FIG. 11 is a perspective view of the outer side of the direction change path.

FIGS. 10(A) and 10(B) are views for comparing a conventional non-twisting locus 18 of the top of the Gothic arch groove shape (FIG. 10(A)) with a twisting locus 18 of the present embodiment (FIG. 10(B)). As seen in FIG. 10(B), the locus 18 is twisted toward the scooping portion 17. Besides, as the locus 18 is twisted, the shape of the scooping portion 17 is analogous to a symmetrical shape with respect to the locus 18. Here, the twisting of the locus is also seen from the perspective view of the outer side of the direction change path 10 on FIG. 11. In FIG. 11, the broken line shows the locus of the conventional design.

As shown in FIG. 5, as the locus 18 of the top of the Gothic arch groove shape is made close to the contact angle line L1 at the scooping portion 17 of the direction change path 10, the scooping portion 17 comes to scoop up each ball 3 in the direction of the contact angle line L1. The scooping portion 17 acts to scoop up the ball not at one, but equally both of the two arcs sides of the Gothic arch groove shape. Therefore, the scooping portion needs not bear any unnecessary force, and even if the spline nut 2 is moved at high speed, the scooping portion 17 is prevented from being damaged.

Figure 12:
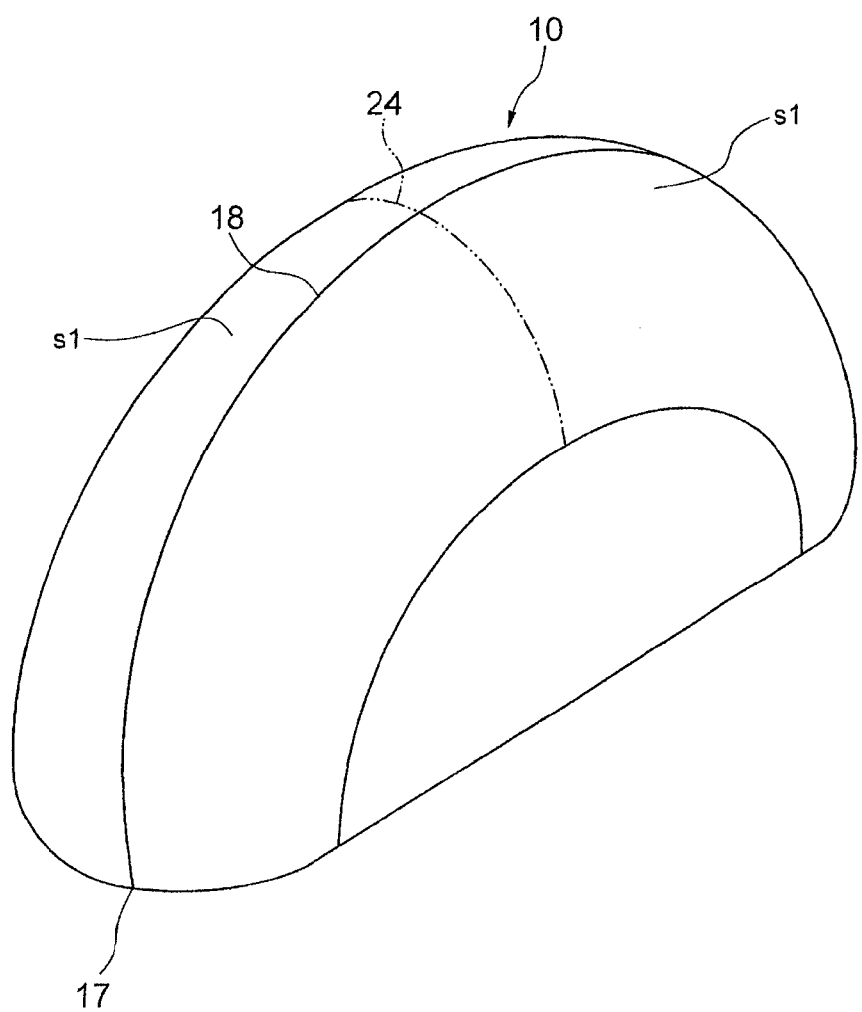
FIG. 12 is a perspective view showing another example of the direction change path.

FIG. 12 shows another example of the direction change path 10. In FIG. 12, in order to easily recognize the locus 18 of the top of the Gothic arch groove shape, the direction change path 10 to which the Gothic arch groove shape is transferred, that is, a space that fits to the Gothic arch groove shape is shown. The direction change path 10 is divided into a twisting area S1 and a non-twisting area S2. In the direction change path 10 of this example, the tangential direction of the locus 18 is continuous at the boundary 24 between the twisting area S1 and the non-twisting area S2. Besides, as approaching to the scooping portion 17, the tangential direction of the locus 18 is inclined gradually. The ultimate position of the locus 18 at the scooping portion 17 is the same as that of the locus 18 shown in FIG. 15.

Figure 13D:
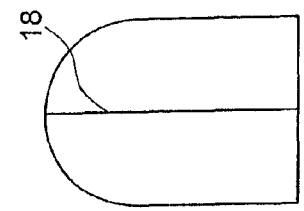
FIGS. 13(A) to 13(D) are detailed views of the direction change path of FIG. 12 (FIG. 13(A) being a front view, FIG. 13(B) being a plane view, FIG. 13(C) being a left side view and FIG. 13(D) being a right side view)
Figure 13B:
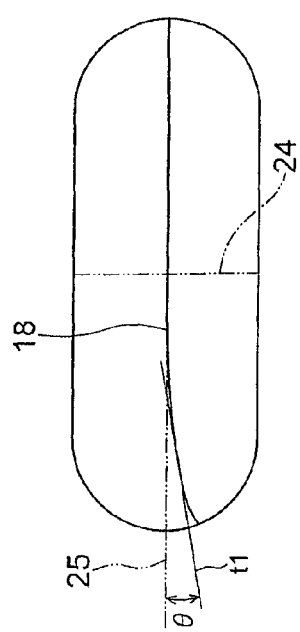
Figure 13A:
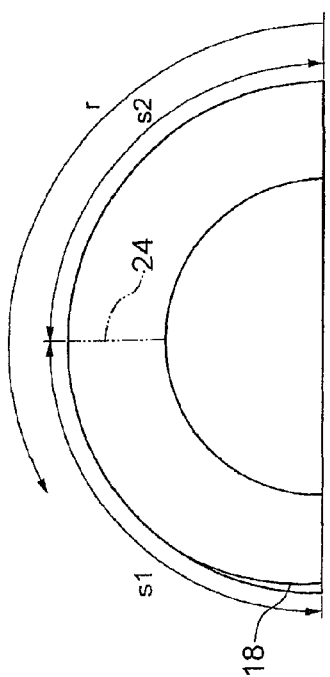
Figure 13C:
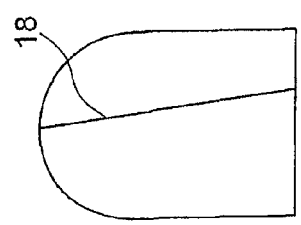

FIGS. 13(A) to FIG. 14(B) are used as a basis to explain the "continuous tangential direction of the locus 18". FIGS. 13(A) to 13(D) are detailed views of the above-mentioned direction change path. FIG. 13(A) is a front view thereof, FIG. 13(B) is a plane view thereof, FIG. 13(C) is a left side view thereof and FIG. 13(D) is a right side view thereof. As shown in FIG. 13(A), it is assumed that the distance from the end of the direction change path 10 along the outer periphery of the direction change path 10 is r. As shown in FIG. 13(B), an angle formed by the tangential direction t1 of the locus 18 and the virtual locus 25 on the assumption that the direction change path 10 is not twisted is indicated by the inclination A.

Figure 14A:
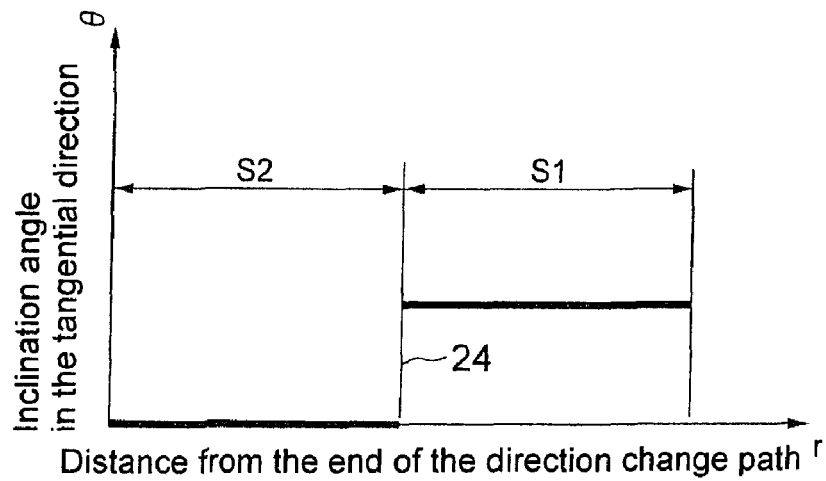
FIGS. 14(A) to 14(B) are graphs showing the relation between the distance r and the inclination θ (FIG. 14(A) being of a conventional example in which the tangential direction of the locus is not continuous and FIG. 14(B) being of an example where the tangential direction of the locus is continuous)
Figure 14B:
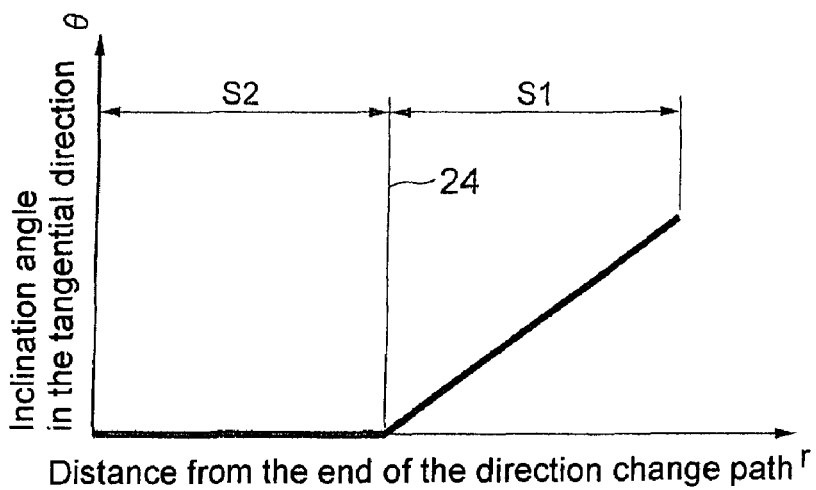
Figure 19:
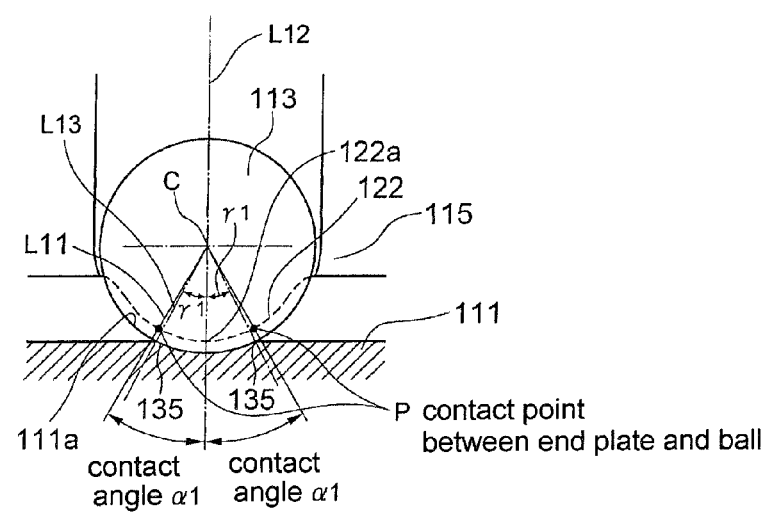
Figure 20:
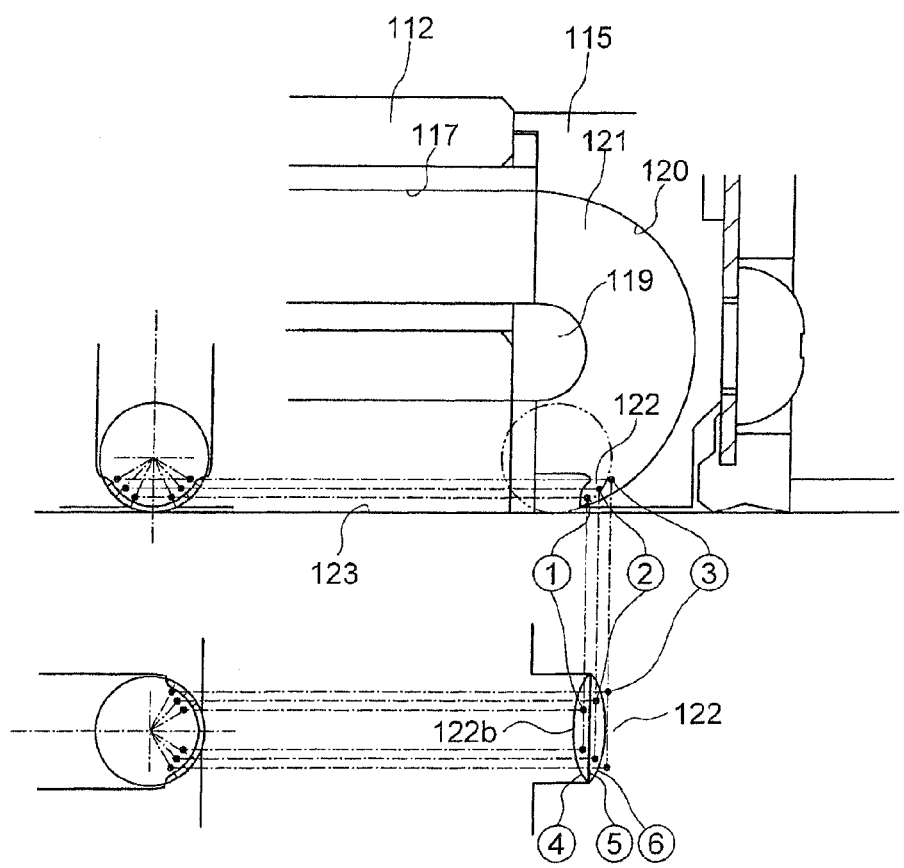
Figure 25:
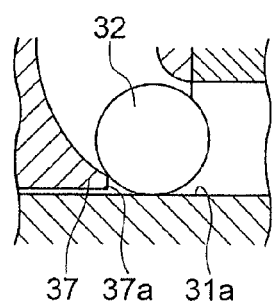
Figure 26:
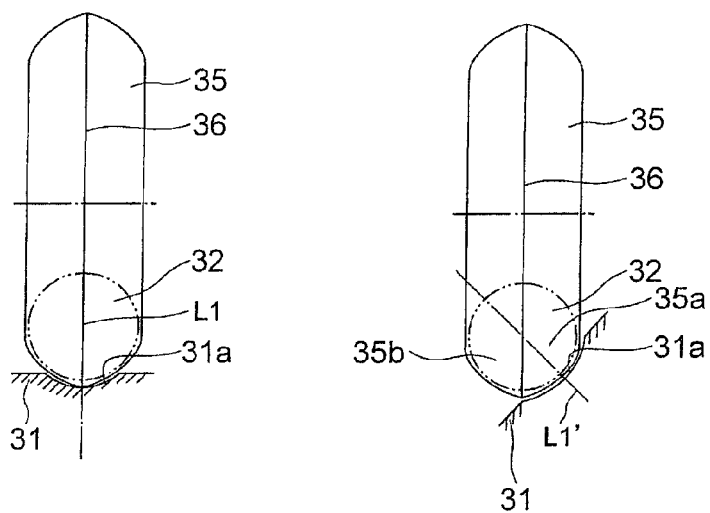
Figure 27:
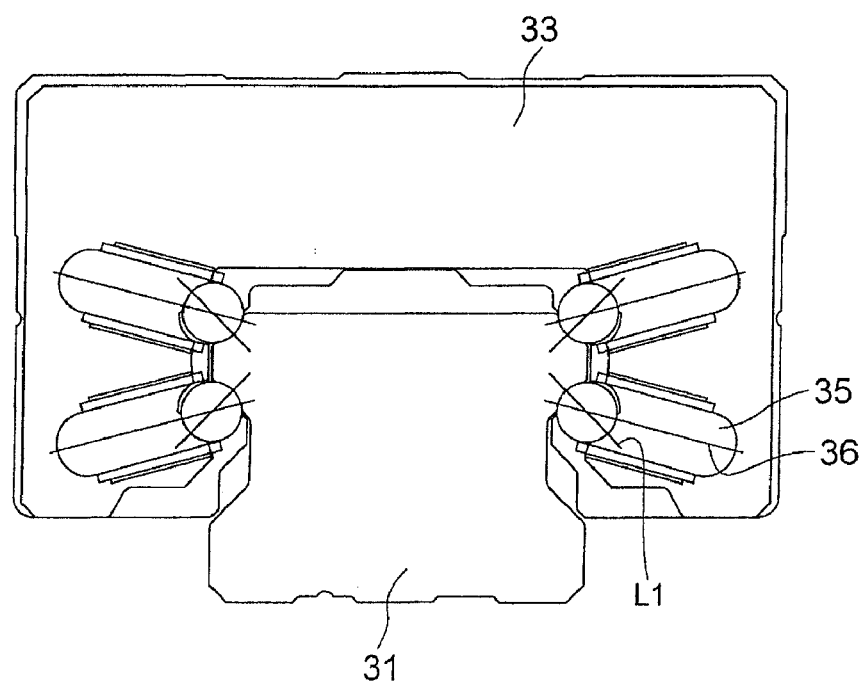

FIGS. 14(A) and 14(B) are graphs showing the relation between the distance r and the inclination $\theta$. FIG. 14(A) is a graph of the comparative example where the tangential direction of the locus 18 is discontinuous, and FIG. 14(B) is a graph of the example where the tangential direction of the locus 18 is continuous as shown in FIG. 12 and FIGS. 13(A) to 13(D). The locus 18 shown in FIG. 15 is inclined abruptly at the boundary between the twisting area and the non-twisting are of the direction change path 10 and linearly at a certain angle. As the locus is thus inclined, the inclination 6 becomes discontinuous at the boundary 24 between the twisting area S1 and the non-twisting area S2.

On the other hand, in this example, as shown in FIG. 12 and FIGS. 13(A) to 13(D), at the boundary 24 between the twisting area S1 and the non-twisting area S2, the tangential direction t1 of the locus 18 is continuous, and as it approaches to the scooping portion 17, the tangential direction t1 of the locus 18 is inclined gradually. With this gradual inclination, as shown in FIG. 14(B), the inclination $\theta$ is zero at the boundary 24 and becomes larger and larger in the twisting area S1. As the inclination angle $\theta$ becomes continuous, the ball 3 in two-point contact with the Gothic arch groove changes its rolling direction not abruptly, but gradually. Hence, the ball 3 is allowed to circulate smoothly.

The present invention is not limited to the above-mentioned first embodiment and may be embodied in various forms without departing from the scope of the present invention. For example, the present invention is not limited to a ball spline but may be applied to a linear guide as long as the direction change path is inclined relative to the contact angle line when seen in the axial direction of the track member.

Further, the Gothic arch groove may not be formed over the whole length of each direction change path or may be formed in at least a part of the direction change path including the scooping portion. In the other part of the direction change path, the cross-sectional shape is preferably changed from the Gothic arch groove shape to the circular arc groove shape gradually. The groove transition area in which the cross-section shape is changed gradually is preferably formed from the position of $\alpha=0$ degree to 90 degrees toward the ball return path (see FIG. 6). As the cross-sectional shape of the ball return path is formed as a circle, if the connection point of the ball return path and the direction change path is shaped having a circular arc groove, the cross-sectional shape of the direction change path and the cross-sectional shape of the ball return path can conform to each other. This enables smooth circulation of balls.

EXAMPLE

The inventors of this application manufactured a ball spline according to the first embodiment and conducted a high-speed durability test. For a conventional end cap, the scooping portion was damaged at 1,000 km, however, for a high-speed capable end cap the scooping portion was not damaged even after 10,000 km of moving.

The present specification is based on Japanese Patent Application No. 2005-318110 filed on Nov. 1, 2005, the entire contents of which are expressly incorporated by reference herein.

The invention claimed is:

1. A motion guide device comprising: a track member having a ball rolling groove formed therein; a moving member having formed therein a loaded ball rolling groove facing the ball rolling groove, a ball return path extending in parallel with the loaded ball rolling groove and a direction change path connecting the loaded ball rolling groove and the ball return path; and a plurality of balls arranged in a ball circulation path including the loaded ball rolling groove, the ball return path and the direction change path, after rolling in the ball rolling groove of the track member each of the balls being scooped up into the direction change path by a scooping portion of the direction change path, and the ball in the direction change path being returned to the ball rolling groove by the scooping portion, wherein the direction change path is inclined relative to a contact angle line connecting a center of the ball and a bottom of the ball rolling groove, when seen in an axial direction of the track member, the direction change path including the scooping portion has a cross section of Gothic arch groove shape formed of two arcs in such a manner that the ball is in contact with the direction change path at two points, and the direction change path is twisted in such a manner that a locus of top of the Gothic arch groove shape approaches the contact angle line at the scooping portion.

2. The motion guide device according to claim 1, wherein the direction change path has a twisting area and a non-twisting area, and a tangential direction of the locus of the top of the Gothic arch groove shape becomes continuous at a boundary between the twisting area and the non-twisting area.

3. A motion guide device comprising: a track member having a ball rolling groove formed therein; a moving member having formed therein a loaded ball rolling groove facing the ball rolling groove, a ball return path extending in parallel with the loaded ball rolling groove and a direction change path connecting the loaded ball rolling groove and the ball return path; and a plurality of balls arranged in a ball circulation path including the loaded ball rolling groove, the ball return path and the direction change path, after rolling in the ball rolling groove of the track member each of the balls being scooped up into the direction change path by a scooping portion of the direction change path, and the ball in the direction change path being returned to the ball rolling groove by the scooping portion, wherein the direction change path is inclined relative to a contact angle line connecting a center of the ball and a bottom of the ball rolling groove, when seen in an axial direction of the track member, the scooping portion has a cross section of Gothic arch groove shape formed of two arcs so as to be in contact with the ball at two points, and a top of the Gothic arch groove shape at the scooping portion is positioned in proximity to the contact angle line.

\* \* \* \* \*